(12) United States Patent
Verheyden

(10) Patent No.: US 12,298,570 B2
(45) Date of Patent: May 13, 2025

(54) FIBER OPTIC CONNECTOR WITH ROTATABLE BOOT

(71) Applicant: CommScope Technologies LLC, Hickory, NC (US)

(72) Inventor: Danny Willy August Verheyden, Gelrode (BE)

(73) Assignee: CommScope Technologies LLC, Hickory, NC (US)

( * ) Notice: Subject to any disclaimer, the term of this patent is extended or adjusted under 35 U.S.C. 154(b) by 186 days.

(21) Appl. No.: 17/893,760

(22) Filed: Aug. 23, 2022

(65) Prior Publication Data

US 2023/0057715 A1 Feb. 23, 2023

Related U.S. Application Data

(60) Provisional application No. 63/236,041, filed on Aug. 23, 2021.

(51) Int. Cl.
*G02B 6/38* (2006.01)
*G02B 6/44* (2006.01)

(52) U.S. Cl.
CPC ........... *G02B 6/389* (2013.01); *G02B 6/3825* (2013.01); *G02B 6/3849* (2013.01); *G02B 6/4471* (2013.01)

(58) Field of Classification Search
CPC .................................... G02B 6/38; G02B 6/44
USPC ............................................................ 385/53
See application file for complete search history.

(56) References Cited

U.S. PATENT DOCUMENTS

| | | | |
|---|---|---|---|
| 6,357,934 B1 * | 3/2002 | Driscoll | G02B 6/3869 385/59 |
| 2011/0229085 A1 * | 9/2011 | Bradley | G02B 6/3871 29/857 |
| 2012/0219254 A1 * | 8/2012 | Bradley | G02B 6/3885 29/407.09 |
| 2018/0267243 A1 * | 9/2018 | Nhep | G02B 6/3889 |
| 2021/0149120 A1 * | 5/2021 | Wong | G02B 6/3893 |
| 2021/0331183 A1 * | 10/2021 | Wong | F16B 37/041 |

FOREIGN PATENT DOCUMENTS

| | | |
|---|---|---|
| WO | 2020/236512 A1 | 11/2020 |
| WO | 2021/041305 A1 | 3/2021 |

* cited by examiner

*Primary Examiner* — Kaveh C Kianni
(74) *Attorney, Agent, or Firm* — MERCHANT & GOULD P.C.

(57) ABSTRACT

A fiber optic connector including a connector body and a cable, the cable including optical fibers and a non-circular jacket. The fiber optic connector additionally including a resilient jacket, the resilient jacket is rotatable relative to the non-circular jacket. The resilient jacket is enabled to rotate by an insert which includes an outer profile which engages with an inner profile of the resilient jacket. The insert includes an inner profile which prevents relative rotation between the insert and the non-circular jacket.

15 Claims, 10 Drawing Sheets

FIBER OPTIC CONNECTOR WITH ROTATABLE BOOT

CROSS-REFERENCE TO RELATED APPLICATIONS

This application claims priority to and the benefit of U.S. Provisional Patent Application No. 63/236,041 filed on Aug. 23, 2021, the disclosure of which is incorporated herein by reference in its entirety.

TECHNICAL FIELD

The present disclosure relates generally to mechanical connection interfaces. More particularly, the present disclosure relates to turn-to-secure mechanical connection interfaces for connectors such as fiber optic connectors.

BACKGROUND

A turn-to-secure connection interface is an interface that is connected and disconnected by a twisting motion. Turn-to-secure connection interfaces have been used with fiber optic connectors. For example, turn-to-secure connection interfaces have been used for securing fiber optic connectors to one another, for securing fiber optic connectors to fiber optic adapters, and for securing accessories such as dust caps to fiber optic connectors. For example, PCT publications WO 2020/236512 and WO2021/041305 show turn to secure connection interfaces.

SUMMARY

Aspects of the present disclosure relate to a fiber optic connector. More specifically the present disclosure relates to a fiber optic connector that includes a resilient boot which is rotatable about a non-circular cable. The resilient boot can function as a turn-to-secure connection interface for connecting the fiber optic connector to another structure such as a fiber optic adapter, a conversion shroud, or a dust cover.

The fiber optic connector includes a connector body extending between a first and a second end along a connector axis. The fiber optic connector includes a resilient boot which is rotatable relative to the connector body about the connector axis. The fiber optic connector additionally includes a fiber optic cable which is non-circular and includes at least one optical fiber. The fibers extend through the second end of the connector body and are accessible at the first end of the connector body. The fiber optic connector additionally includes an insert. The insert has a cross-sectional profile which includes an inner opening engaged with the non-circular jacket and an outer profile engaged with an inner profile of the resilient boot. The outer profile is configured to allow rotation relative to the connector body of the resilient boot and the inner opening configured to prevent relative rotation between the insert and the non-circular jacket.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated herein and constitute a part of the description, illustrate several aspects of the present disclosure. A brief description of the drawings is as follows.

DETAILED DESCRIPTION

Figure 1:
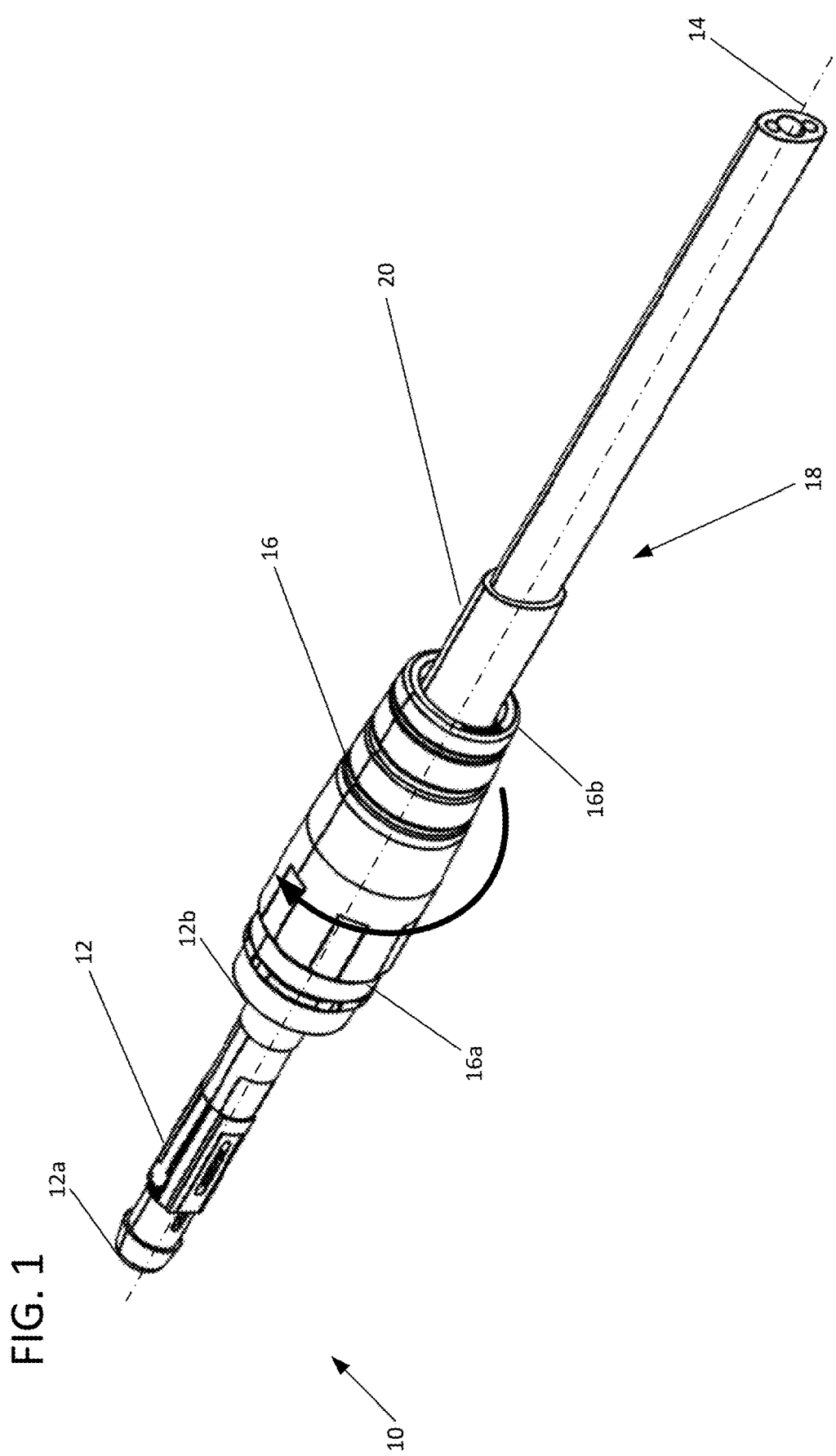
FIG. 1 depicts a fiber optic connector featuring in accordance with the principles of the present disclosure.
Figure 2:
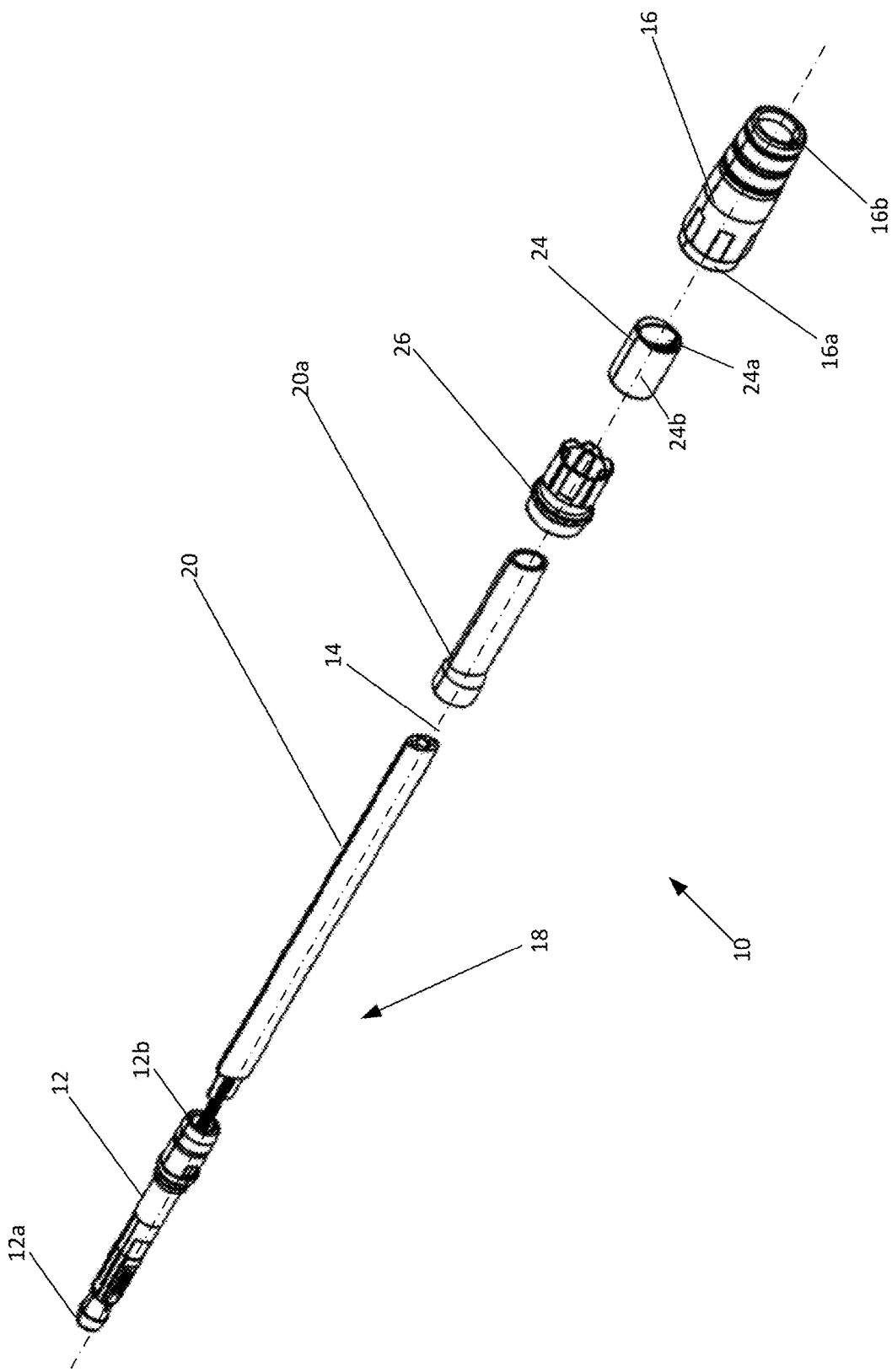
FIG. 2 is an exploded view of the fiber optic connector of FIG. 1.
Figure 3:
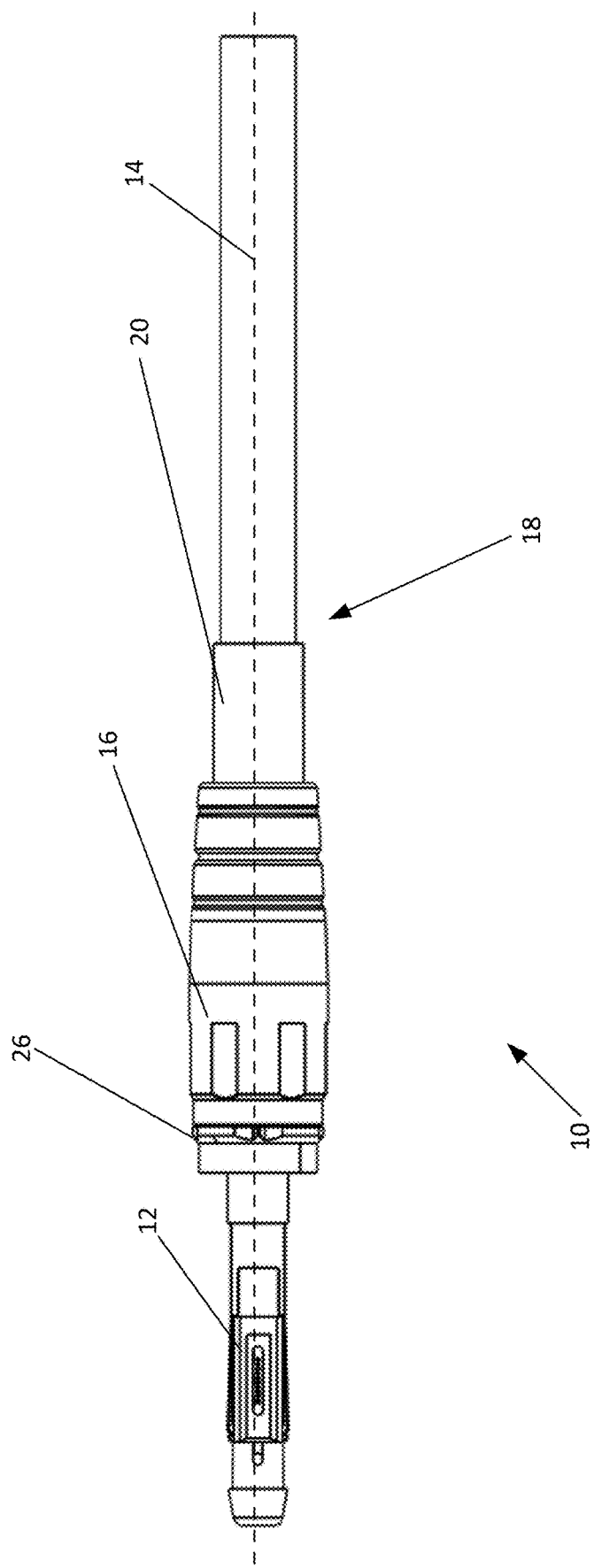
FIG. 3 is a side view of the fiber optic connector of FIG. 1.
Figure 4A:
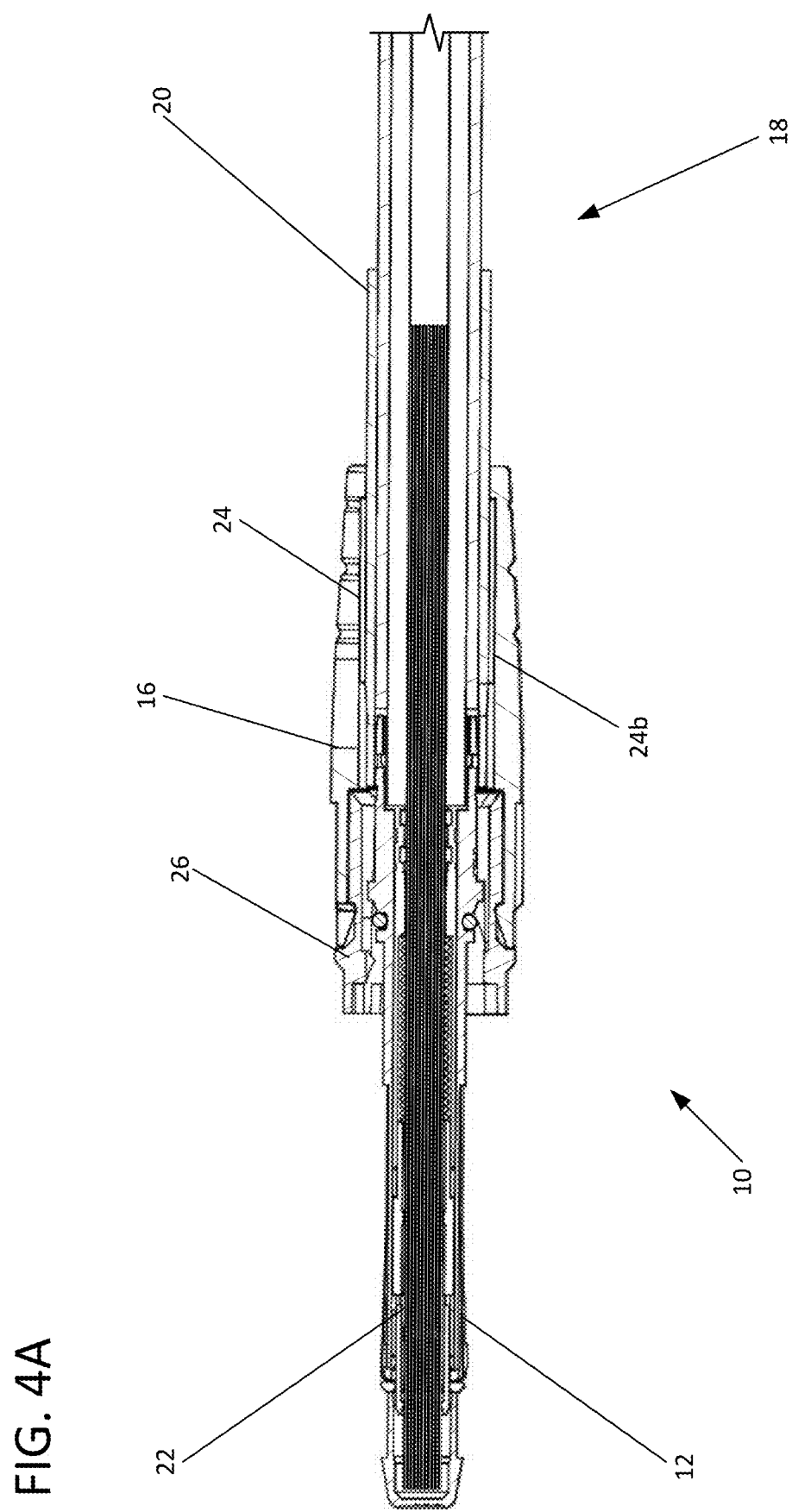
FIG. 4A is a cross-sectional view of the fiber optic connector of FIG. 1.
Figure 4B:
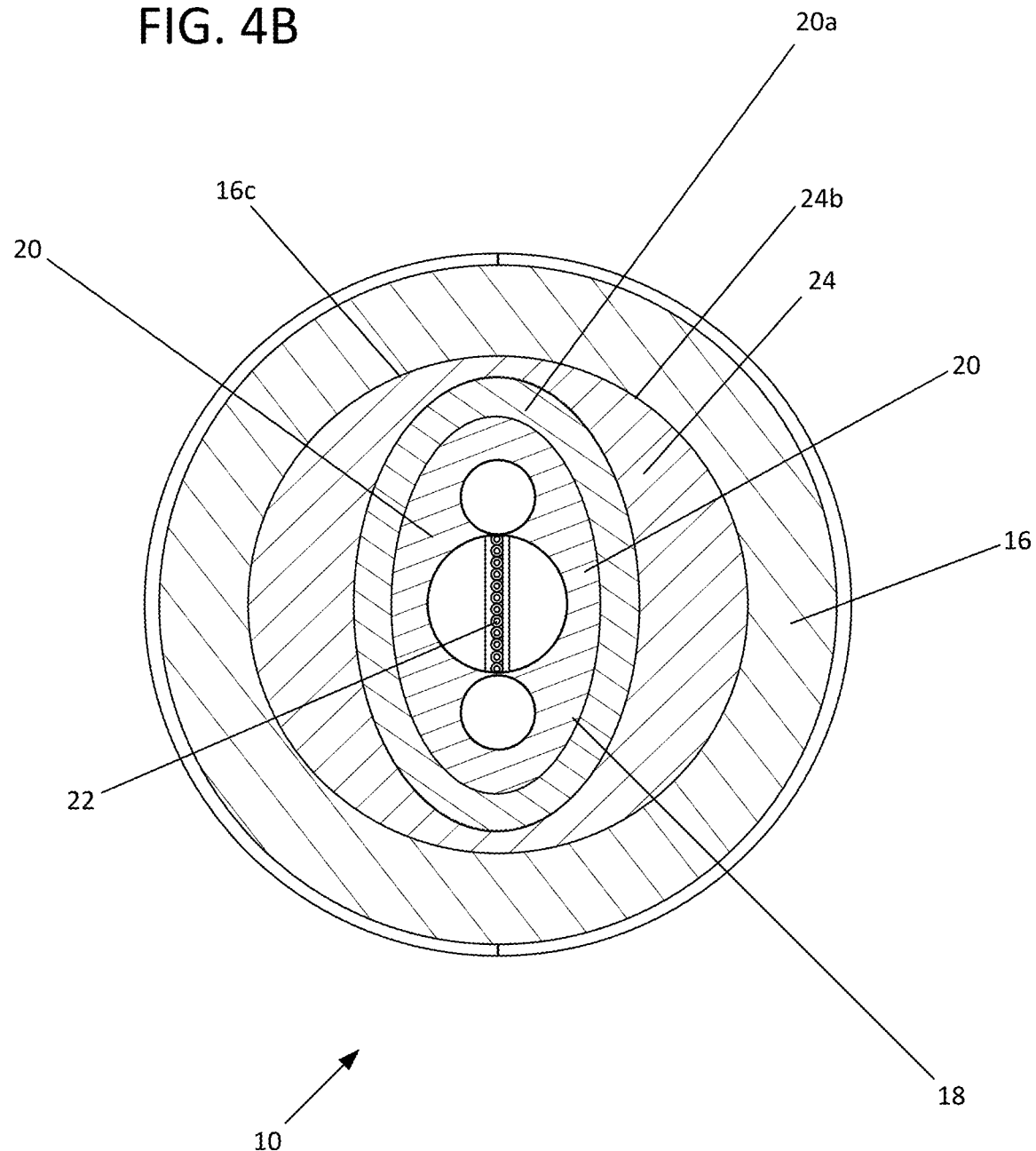
FIG. 4B is another cross-sectional view of the fiber optic connector of FIG. 1.

FIGS. 1 through 4 show a fiber optic connector 10 in accordance with the principles of the present disclosure. The fiber optic connector 10 includes a connector body 12. The connector body 12 extends along a connector axis 14 between a first end 12a and a second end 12b. The fiber optic connector 10 additionally includes a resilient boot 16. The resilient boot 16 extends between a first end 16a and a second end 16b. The resilient boot 16 is rotatable relative to the connector body 12 about the connector axis 14. The fiber optic connector 10 mounts at the end of a cable 18. The cable 18 includes a non-circular jacket 20 and at least one optical fiber 22. As depicted, the cable 18 includes a plurality of optical fibers 22. The optical fibers 22 extend through the second end 12b of the connector body 12 and are accessible at the first end 12a of the connector. Thus, the fiber optic connector 10 is a multi-fiber connector. In other examples, the cable can be a single fiber cable and the connector can be a single fiber connector.

The resilient boot 16 provides strain relief to the cable/fibers adjacent the rear end of the connector body 12. The resilient boot 16 is mounted at the second end 12b of the connector body 12 and over the non-circular jacket 20 of the cable 18. To allow the resilient boot 16 to rotate about the connector axis 14, the fiber optic connector 10 includes an insert 24. The insert 24 (seen in isolation at FIGS. 6 and 7, additionally visible in FIGS. 2 and 4A-4B) includes an inner profile 24a which surrounds the non-circular jacket 20. In some examples, the non-circular jacket includes a heat shrink sleeve 20a which fits over the non-circular jacket 20 to provide sealing to the second end 12b of the connector body 12. The heat shrink sleeve 20a fits over the non-circular jacket 20 by heating the heat shrink sleeve 20a. When heated, the heat shrink sleeve 20a shrinks over the non-circular jacket 20 and conforms to the shape of the non-circular jacket 20 building up the outer profile of the non-circular jacket 20 to a larger size. In some examples, the inner profile 24a engages with the heat shrink sleeve 20a (See FIGS. 4A and 4B).

The insert 24 additionally includes an outer profile 24b which engages with an inner profile 16c of the resilient boot 16. The outer profile 24b is configured to allow rotation of the resilient boot 16 relative to the connector body 12. The inner profile 24a is configured to prevent relative rotation between the insert 24 and the non-circular jacket 20 (or the heat shrink sleeve 20a) of the cable 18. In the depicted embodiment, the non-circular jacket 20 is elongate in outer cross-sectional profile (e.g., obround, oval, race-track shaped).

In some embodiments, fiber optic connector 10 additionally includes a coupler 26 integrated with the first end 16a of the resilient boot 16 and configured to rotate with the resilient boot 16. In some examples, the resilient boot 16 is configured to rotate to a pre-determined rotation angle. In some examples, the predetermined rotation corresponds to a turn-to-secure connection. When the resilient boot 16 rotates the predetermined angle, the coupler 26 concurrently rotates the predetermined rotation angle. The coupler 26 mounts within the front end of the resilient boot 16. The resilient boot 16 and the coupler 26 engage one another such that they are adapted to rotate in unison with one another In some examples, the pre-determined rotation angle is less than or equal to 180 degrees. In some examples, the predetermined rotation angle is less than or equal to 90 degrees.

Figure 5:
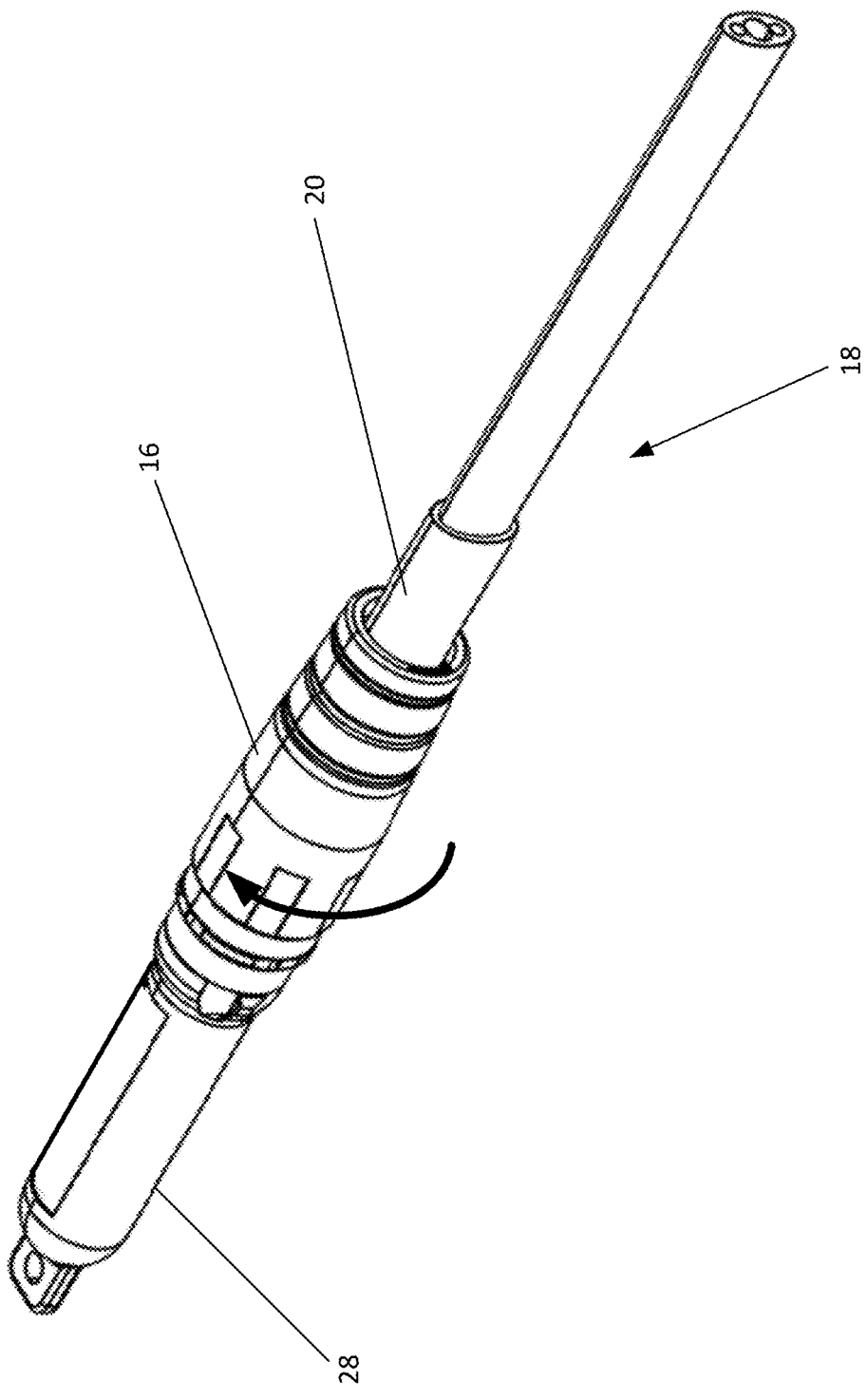
FIG. 5 is the fiber optic connector of FIG. 1 with a dust cap attached.

In some examples, the coupler 26 is rotated to the predetermined angle to secure the fiber optic connector 10 to a component that has a mating turn-to-secure connection. In some embodiments the component is a dust cap 28 (see FIG. 5). In other embodiments the component is a fiber optic adapter used to connect the fiber optic connector 10 to another fiber optic connector 10. In other embodiments, the component is a different fiber optic connector 10.

Figure 6:
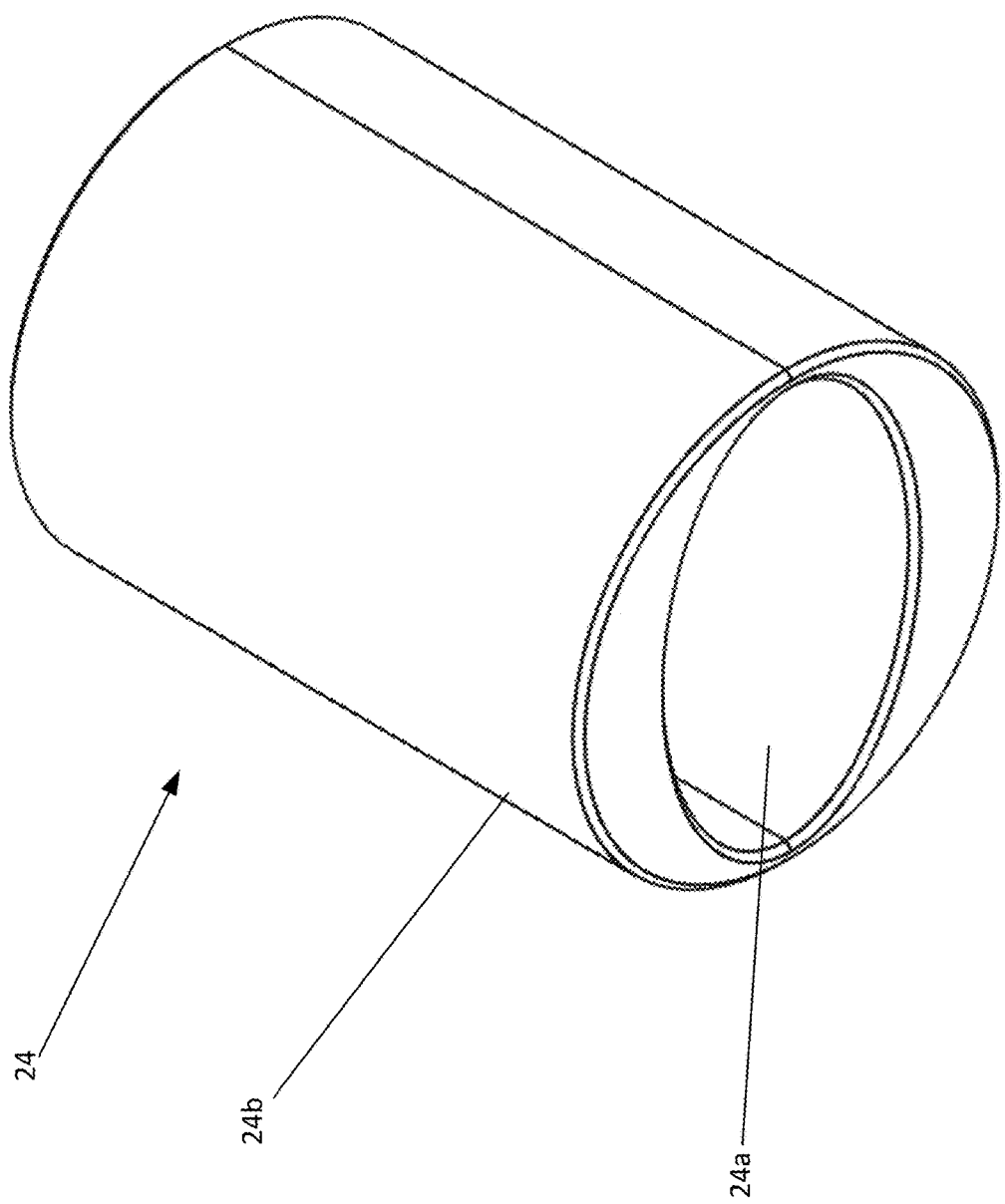
FIG. 6 is an insert in isolation from the fiber optic connector of FIG. 1.
Figure 7:
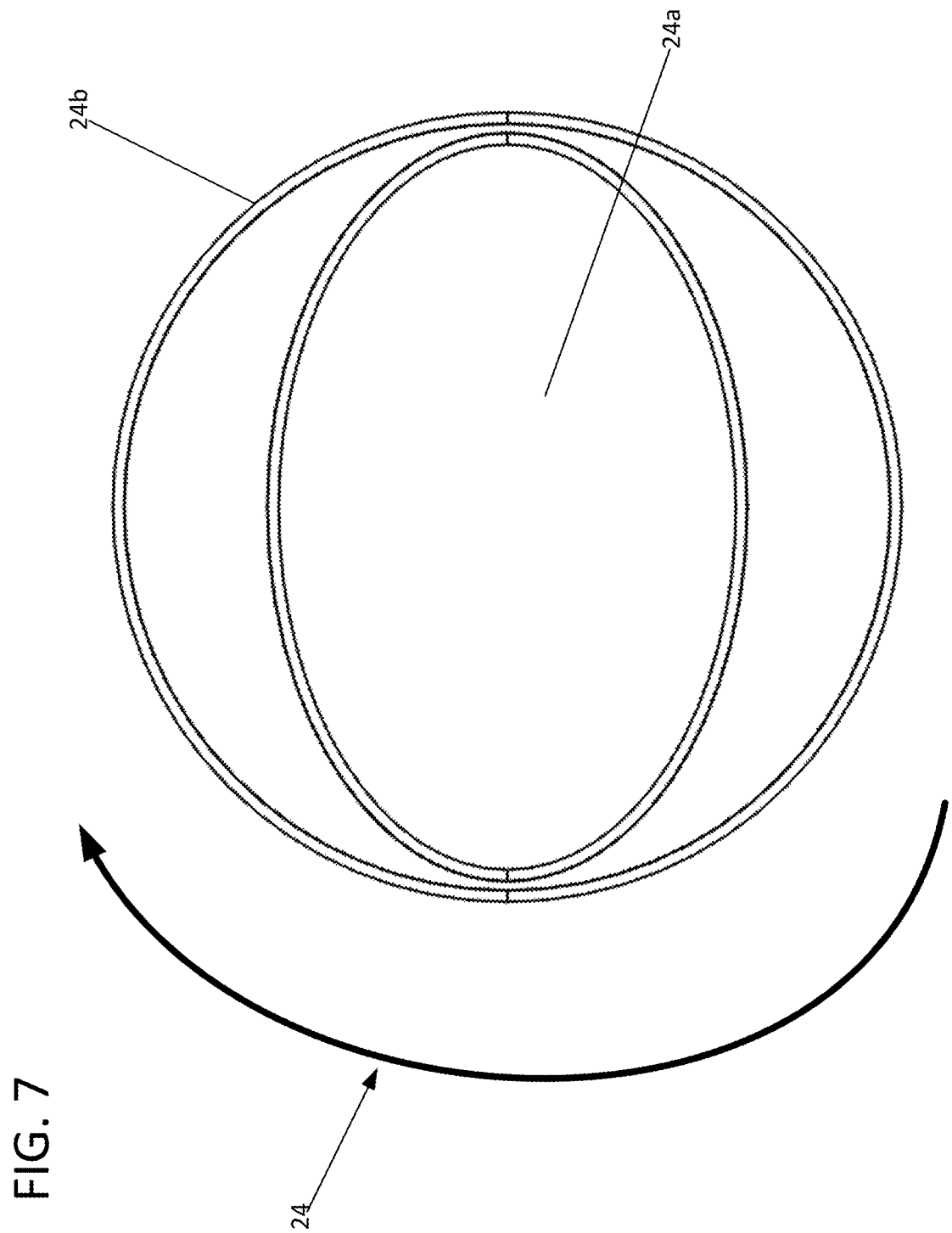
FIG. 7 is a front view of the insert of FIG. 5.
Figure 8:
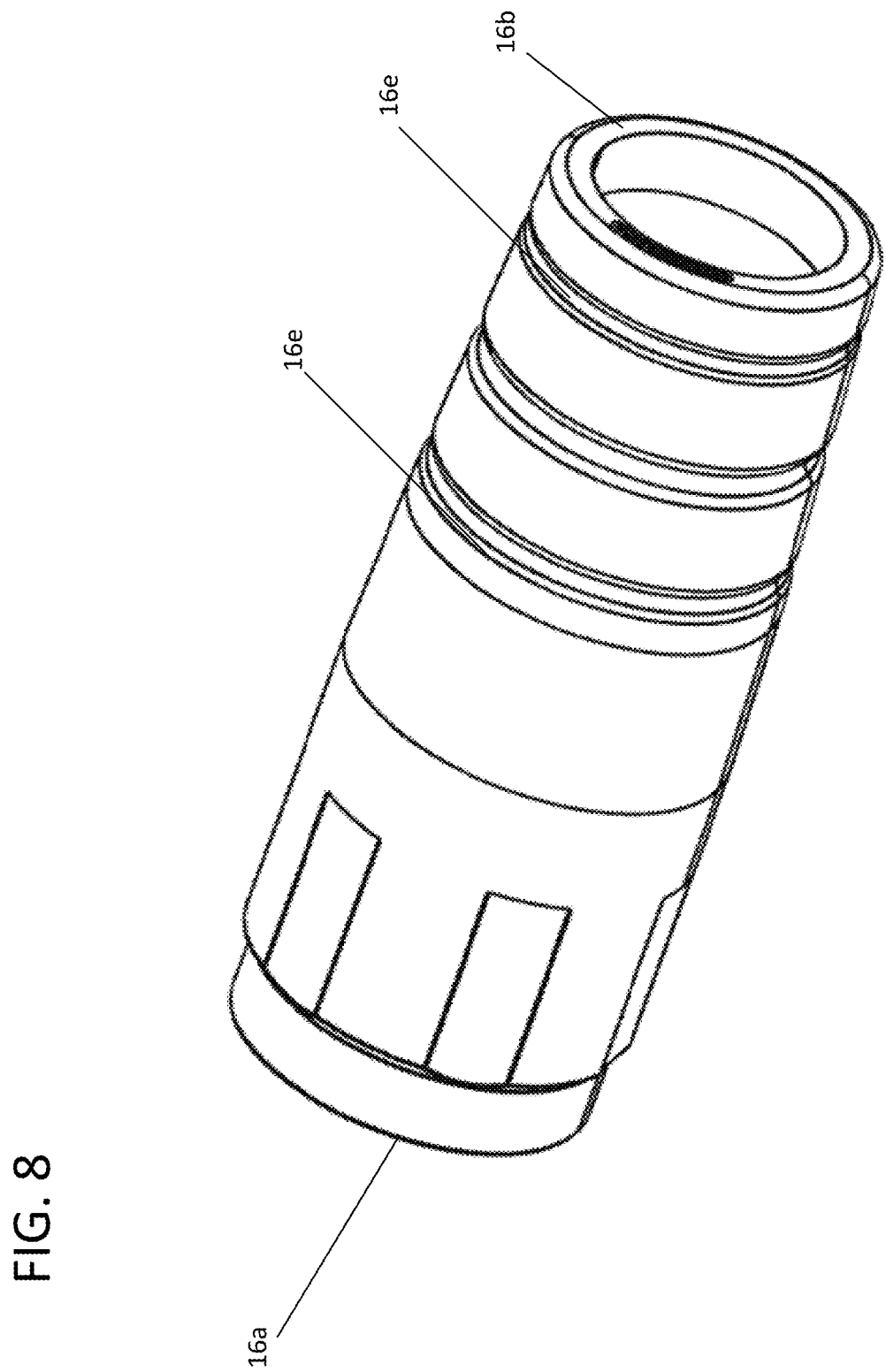
FIG. 8 is a resilient boot in isolation from the fiber optic connector of FIG. 1.
Figure 9:
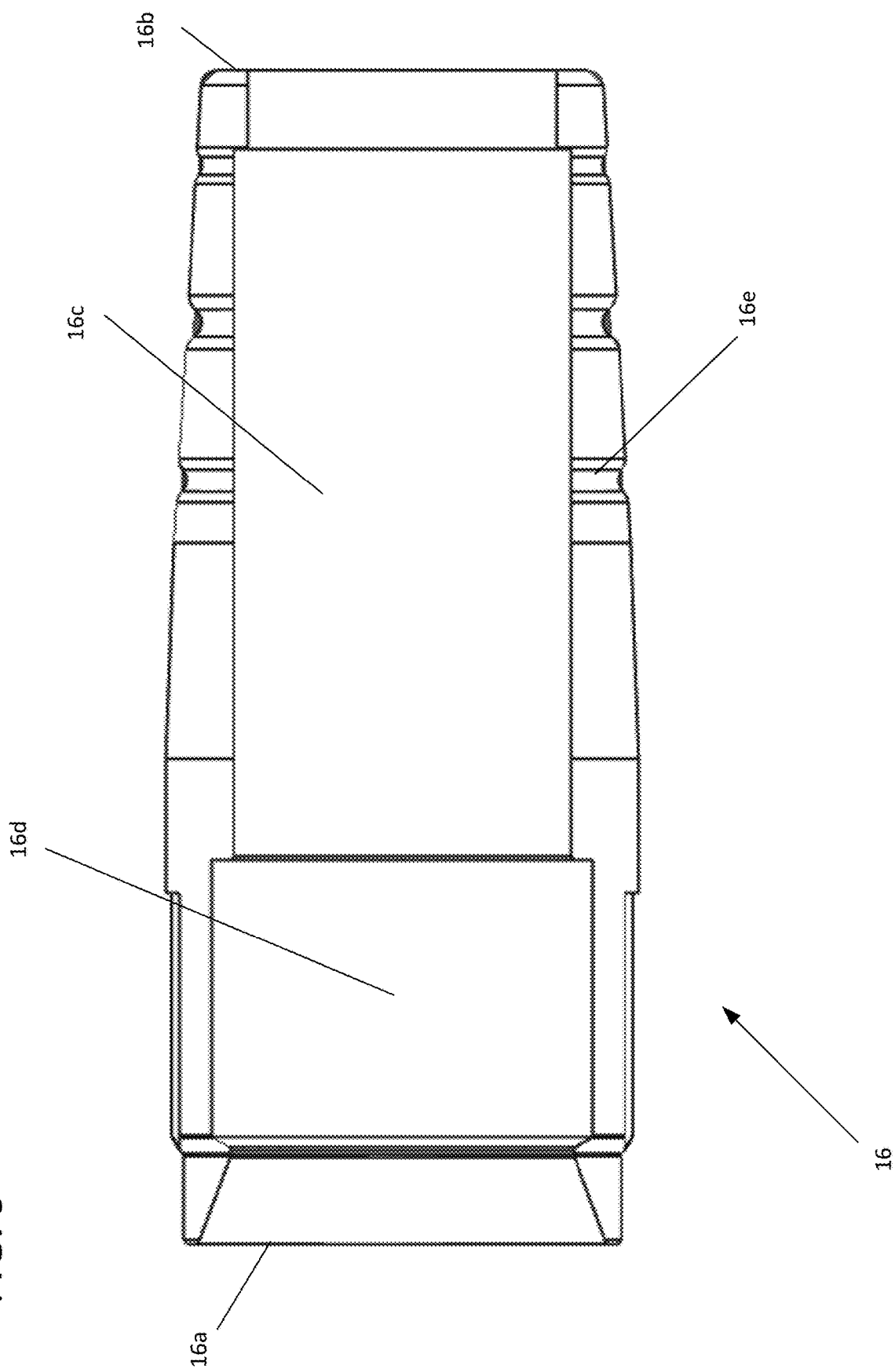
FIG. 9 is a cross-sectional view of the resilient boot of FIG. 7.

FIGS. 6 and 7 show the insert 24 in isolation. In the depicted embodiment, the inner profile 24a is shaped similarly to the non-circular jacket 20 and the heat shrink sleeve bonded over the jacket (e.g., the inner profile 24a matches or has a complementary shape with respect to the outer profile 24b of the jacket) and configured to prevent relative rotation between the non-circular jacket 20 and the insert 24. The outer profile 24b of the insert 24 is smooth and circular in the depicted embodiment. The outer profile 24b, as discussed above, fits within the inner profile 16c of the resilient boot 16 allowing the resilient boot 16 to rotate about the non-circular jacket 20. The inner profile 16c of the resilient boot 16 (as seen easily at FIG. 9) is sized and shaped to engage with (e.g., bear against) the outer profile 24b of the insert 24. The resilient boot 16 additionally includes a transition profile 16d which is larger than the inner profile 16c and configured to fit over the rear end of the connector body 12 over which the heat shrink is conformed. In some embodiments, the resilient boot 16 includes a plurality of circumferential ribs 16e for enhancing flexibility. In some embodiments, the insert 24 additionally includes a plurality of circumferential ribs that may also provide flexibility. In some embodiments, the resilient boot 16 tapers as it extends from the first end 16a to the second end 16b to provide additional flexibility. In some embodiments, the resilient boot 16 includes slits, grooves, or other structures to provide additional flexibility.

From the forgoing detailed description, it will be evident that modifications and variations can be made without departing from the spirit and scope of the disclosure.

What is claimed is:

1. A fiber optic connector, the fiber optic connector comprising:
   a connector body extending between a first and a second end along a connector axis;
   a resilient boot including a first and a second end, the resilient boot being rotatable relative to the connector body and about the connector axis;
   a cable including a non-circular jacket, causing the cable to have a non-circular outer profile, and at least one optical fiber, the cable extending through the resilient boot, the optical fibers extending through the second end of the connector body and being accessible at a first end of the connector body; and
   an insert having a cross-sectional profile including an inner opening of the insert having a complementary shape with respect to the non-circular outer profile of the non-circular jacket and an outer profile of the insert engaged with an inner profile of the resilient boot, the outer profile of the insert configured to allow rotation of the resilient boot relative to the connector body and the inner opening of the insert configured to prevent relative rotation between the insert and the non-circular jacket.

2. The fiber optic connector of claim 1, further comprising a coupler, the coupler being mounted to the first end of the resilient boot wherein the coupler is configured to rotate with the resilient boot.

3. The fiber optic connector of claim 2, wherein the coupler is used to secure the fiber optic connector to a component by rotating the resilient boot to a predetermined rotation angle.

4. The fiber optic connector of claim 3, wherein the rotation angle is less than or equal to 180 degrees.

5. The fiber optic connector of claim 3, wherein the rotation angle is less than or equal to 90 degrees.

6. The fiber optic connector of claim 3, wherein the component is a fiber optic adapter.

7. The fiber optic connector of claim 3, wherein the component is a dust cap.

8. The fiber optic connector of claim 1, wherein the non-circular jacket is oval in shape and the inner opening is oval in shape.

9. The fiber optic connector of claim 1, wherein the non-circular jacket of the cable has sides and the inner opening of the insert has flat sides.

10. The fiber optic connector of claim 1, wherein the resilient boot has ribs.

11. The fiber optic connector of claim 10, wherein the insert has ribs.

12. The fiber optic connector of claim 1, wherein the boot is configured to provide strain relief to the connector body.

13. The fiber optic connector of claim 1, wherein there is at least one optical fiber.

14. The fiber optic connector of claim 1, wherein there are at least twelve optical fibers.

15. The fiber optic connector of claim 1, further comprising a heat shrink sleeve wherein the heat shrink sleeve surrounds the non-circular jacket and the insert engages with the heat shrink sleeve.

* * * * *